(12) United States Patent
Patel et al.

(10) Patent No.: US 6,941,242 B2
(45) Date of Patent: Sep. 6, 2005

(54) VERSATILE SYSTEM FOR VARIANCE-BASED DATA ANALYSIS

(75) Inventors: Nital S. Patel, Plano, TX (US); Rajesh Tiwari, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 131 days.

(21) Appl. No.: 10/676,399

(22) Filed: Oct. 1, 2003

(65) Prior Publication Data

US 2005/0075834 A1 Apr. 7, 2005

(51) Int. Cl.$^7$ ............................................. G06F 17/18
(52) U.S. Cl. ..................................................... 702/179
(58) Field of Search ................... 702/81, 84, 179–182, 702/185, 189, 194; 708/100, 200; 703/2, 4

(56) References Cited

U.S. PATENT DOCUMENTS

2005/0064608 A1 * 3/2005 Patel et al. ..................... 438/5

* cited by examiner

Primary Examiner—Michael Nghiem
(74) Attorney, Agent, or Firm—Peter K. McLarty; W. James Brady, III; Frederick J. Telecky, Jr.

(57) ABSTRACT

The present invention defines a versatile system for analyzing accuracy of industrial measurement data. The system of the present invention compiles measurements of a primary device characteristic from a representative cross-section of a population of devices. The system provides a modeling function, from which is determined a variance for each measurement—forming a corresponding compilation of variances (200). The compilation of variances is evaluated for discontinuities (300), to identify a discontinuity within the compilation of variances. This discontinuity is utilized to determine a demarcation (302) between accurate and inaccurate measurement data.

35 Claims, 3 Drawing Sheets

VERSATILE SYSTEM FOR VARIANCE-BASED DATA ANALYSIS

TECHNICAL FIELD OF THE INVENTION

The present invention relates generally to the field of data analysis and, more particularly, to constructs and methods for ascertaining quality of measurements rendered during industrial processes.

BACKGROUND OF THE INVENTION

There are a number of industries that utilize very high precision processes in their businesses. Medical device, semiconductor, and machining equipment manufacturers—among others—often produce or utilize devices having very small-scale (e.g., sub-micron level) features and tolerances. In such applications, precise and accurate measurements are critical to the functionality and marketability of device.

Over time, a number of devices and methods have been developed for measuring and profiling such small-scale devices. Such characterization is sometimes referred to as metrology. Unfortunately, depending upon how small a particular device may be, a number of conventional metrology methods are destructive in nature. Such methods rely on a partial or complete disassembly or dissection of the device in order to provide an accurate measurement. Often, such processes are partially or completely manual, and the device being measured or profiled is completely or effectively destroyed in the process. Although they tend to provide highly accurate characterizations, these approaches are not of much use for high-volume commercial applications.

Other non-destructive metrology methods have been developed to provide small-scale measurement and characterization. One of the more common such methods is the use of profilometry. Profilometry is typically a non-destructive process that involves physical movement of some fine-gauge sensory instrument (e.g., a stylus) along the surface of a device being profiled. Profilometry provides a physical measurement or characterization of a device, relative to some reference or starting point. Thus, although not destructive in nature, profilometry and other similar approaches provide only vector data. Most such systems do not provide any function or capability for checking the accuracy of the profile measurement.

In response, the accuracy of profilometry and other similar approaches is often checked via statistical analysis. Historical data, taken from measurements at several locations on a device, or several devices within a lot, is compiled for analysis. Often, such data is organized and analyzed by conventional metrics such as range and standard deviation. Unfortunately, such metrics are typically subjective in nature, data-intensive, and may be impacted by a number of variables (e.g., the number of data points compiled). Analysis methods utilizing these metrics typically do not provide an immediate and clearly identifiable indicator of a subtle shift from accurate to inaccurate measurement. Instead, inaccuracies may go undetected as gradual shifts in a trend line of range or standard deviation data.

As a result, there is a need for a versatile system for analyzing the accuracy of profilometry and other similar data—a system that provides immediate and clear indication of data inaccuracies in a simple, efficient and effective manner.

SUMMARY OF THE INVENTION

The present invention provides a versatile system for analyzing the accuracy of profilometry and other similar data. The system of the present invention provides immediate and clear indication of profilometry data inaccuracies in a simple, efficient and effective manner.

More specifically, the present invention provides a versatile system for analyzing the accuracy of measurement data utilizing a variance, or residual, metric. According to the present invention, a sampling of measurement data from a target device or lot is compiled. From the compiled data, a function modeling the data trend is developed. The variance of each data point from the model function is determined. This metric is referred to as the residual. The residual trend line is evaluated for discontinuities—identifying shifts from accurate measurement data to inaccurate data.

Among its many embodiments, the present invention provides a method for analyzing accuracy of industrial measurement data. A plurality of measurements of a primary characteristic, taken from a representative cross-section of a population of devices, is compiled. A modeling function is provided, and a variance from the modeling function for each measurement in the plurality of measurements is determined to form a corresponding plurality of variances. The plurality of variances is evaluated for discontinuities, and any discontinuity within the plurality of variances is identified. The discontinuity is utilized to determine a demarcation between accurate and inaccurate measurement data.

The present invention also provides a system for analyzing the accuracy of industrial measurement data. The system comprises a construct for compiling a plurality of measurements of a primary characteristic from a representative cross-section of a population of devices. The system further comprises a modeling function, and a construct for determining a variance from the modeling function for each measurement in the plurality of measurements and forming a corresponding plurality of variances. A construct for evaluating the plurality of variances for discontinuities is included, as is a construct for identifying a discontinuity within the plurality of variances. The system also comprises a construct for determining a demarcation between accurate and inaccurate measurement data based on the discontinuity.

The present invention further provides a method for analyzing the accuracy of post-CMP dishing measurements rendered by a profilometer in a semiconductor manufacturing process. The method includes compiling a plurality of dishing measurements from a representative cross-section of semiconductor devices. A modeling function is provided. The variance from the modeling function for each dishing measurement in the plurality of dishing measurements is determined to form a corresponding plurality of variances. The plurality of variances is evaluated for discontinuities. Any discontinuity within the plurality of variances is identified. The discontinuity is utilized to determine a demarcation between accurate and inaccurate dishing measurement data.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

Figure 1:
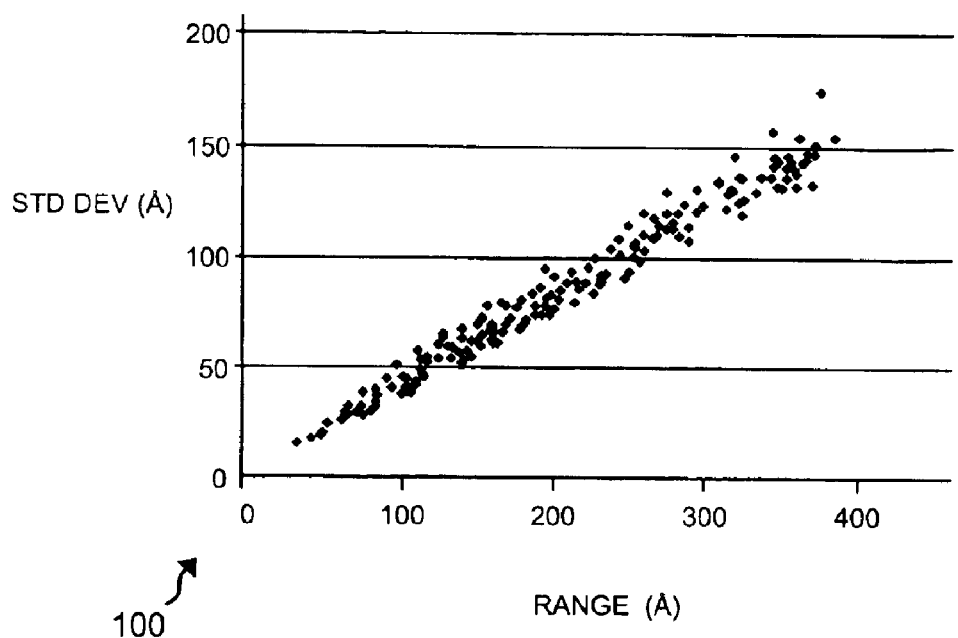
FIG. 1 depicts an illustrative data plot for one embodiment of the present invention.

While the making and using of various embodiments of the present invention are discussed in detail below, it should be appreciated that the present invention provides many applicable inventive concepts, which can be embodied in a wide variety of specific contexts. The invention will now be described in conjunction with providing a system for analyzing the accuracy of profilometry data. It should be appreciated, however, that the present invention may be applied in a wide variety of data analysis applications. Furthermore, certain aspects and embodiments of the present invention are described hereinafter in illustrative reference to processes utilized during the manufacture of semiconductor devices. It should be further appreciated that the present invention may be similarly applied in any industrial manufacturing process (e.g., machining, medical instrumentation) where the accuracy of high-precision, small-scale measurements is critical. The specific embodiments discussed herein are, therefore, merely illustrative of specific ways to make and use the invention and do not limit the scope of the invention.

The present invention provides a versatile system for analyzing data accuracy—particularly the accuracy of profilometry and other similar data. Analysis according to the present invention provides an immediate and clear indication shifts from accurate to inaccurate data in a simple and efficient manner. The system of the present invention provides analyses utilizing a variance, or residual, metric. According to the present invention, a cross-sectional measurement data from a target sample (e.g., a device or lot) is compiled. From the compiled data, a function (e.g., linear, parabolic) that models the actual or desired distribution (e.g., trend line) of the compiled data is developed. For each data point within the compiled data, its variance from the model function is determined. This metric is referred to as the residual. The residual values may are plotted (e.g., into a trend line), or otherwise progressively examined, and evaluated for sudden discontinuities in the progression—indicating and identifying shifts from accurate data points to inaccurate data points.

The present invention provides a system that is easily adaptable to, and integratable with, a wide variety of high-volume manufacturing processes. The system of the present invention provides a focused methodology for evaluating data accuracy in a number of high-precision, small-scale applications.

Conventionally, certain metrology tools (e.g., film thickness measurement tools) usually have built-in models that are compared to measurements or signals received an object being characterized (e.g., an interference pattern received from a semiconductor wafer when using ellipsometry). Accuracy or validity of the measurements taken are determined using a "goodness of fit" (GOF) metric, that measures how well the measurement or signal data received by the metrology tool matches up with a goal dictated by the model. This metric has been relied upon in such systems to indicate issues with the data quality.

In the case of profilometry, however, which is a pure physical measurement, no such metric is available. Conventionally, the range of the data across a target sample is used to detect issues with accuracy of the measurement. However, a range metric tends to be highly subjective and susceptible to a number of distorting influences (e.g., mechanical instruments bias, number of measurements performed, etc.). Furthermore, use of a range metric does not provide a clear and defined distinction between good and bad data. In some instances, conventional systems further or alternatively rely on a standard deviation metric or analysis. Unfortunately, however, there is often a strong correlation between the two parameters. Thus, bias or distortion affecting one will also skew the other. Furthermore, evaluation of both such metrics often reveals strong continuity in values—marginalizing their value as an immediate indicator of data accuracy.

In contrast, the variance-based residual metric of the present invention provides a reliable and clear indication of even subtle shifts from accurate to inaccurate data. The present invention is described now with reference to an illustrative example. For purposes of explanation and illustration, one compilation of measurement data from a particular manufacturing process is assembled. A primary feature or characteristic of concern ($F_1$) is measured by a profilometer. The profilometer returns a measurement value in some small-scale unit (e.g., microns, angstroms, etc.).

Measurement data is collected from a representative cross-section ($S_N$) of the entire population (P) of products or devices being manufactured. There may be just one, or a plurality of $S_N$ within P. $S_N$ may comprise several measurements of $F_1$ made at different instances or locations upon a single device, several measurements of $F_1$ made upon random devices within a single lot, or accumulations of one or both such data sets. The representative values for each $S_N$ are thus determined, and compiled for all $S_N$ within P. This compilation of all representative values, across all $S_N$ for all of P, is hereafter referred to as ($C_P$).

A modeling function is provided. The modeling function defines the expected or desired behavior (e.g., distribution) of $C_P$, and may be of a constant, linear, parabolic or other geometric nature. In certain embodiments, for example, the modeling function may simply be provided as a constant value—one that should be expected for all measurements within $C_P$. In other embodiments, the modeling function may be provided as a mathematical function relating the expected or desired measurements of $F_1$ to some secondary feature or characteristic ($F_S$) of the devices in, or processing of, P. For example, if $F_1$ defines the thickness of a particular feature on a machined work piece, then mathematical function may be provided relating $F_1$ to characteristics such as the density of the work piece, the amount of machining time, etc.

This function is applied to each measurement value within $C_P$. For each such measurement value ($M_N$), its variance from the modeling function is calculated. For example, assume that the modeling function is provided as a constant value of 200 Å. A particular $M_N$ is 220 Å. $M_N$ varies from the modeling function by +20 Å. Thus, the residual value of $M_N$ is +20 Å. If $M_N$ is 180 Å, then the residual value of $M_N$ is −20 Å. Regardless of what form the modeling function is provided in, the residual values for each $M_N$ are calculated similarly. In certain alternative embodiments, residual values may be calculated for only a portion of the $M_N$ within $C_P$. For example, residual values may be calculated only for select (e.g., every third, every fifth, every tenth) $M_N$ within $C_P$. The final set of residual values is hereafter referred to as ($R_P$).

$R_P$ is evaluated or analyzed for discontinuities in the residuals contained therein. In certain embodiments, this analysis may be provided in the form of graphic plotting and evaluation. For example, residual values within $R_P$ may be plotted against corresponding range or standard deviation values for respective $M_N$. In this case, the values against which the residual values are plotted are selected to provide a clear and immediate demarcation between valid and invalid measurement values. Upon examination of residual value plots, inaccuracies in measurement data are revealed by sharp disjunctions in the plot distributions. In alternative embodiments, similar progressive analyses of a non-graphical nature may be provided for evaluating $R_P$, and for identifying discontinuities therein. A threshold for continuity may optionally be provided for optimizing or fine-tuning all such processes.

The analyses described above may be implemented in a number of manual or automated manners, or combinations of both. Various hardware or software constructs or functions may be utilized to provide the desired analyses. For example, algorithms implementing the processes described above may be implemented in separate or combined code segments, for operation and execution on a processor. The graphic analyses may be provided on a display assembly (e.g., a computer display screen), or in printed form (e.g., a graph printed on paper). Each analytical process may be provided with complete, partial or no user interactivity. In alternative embodiments, for example, the discontinuity evaluation of $R_P$ may be provided in a completely automated, non-graphical manner. Such evaluation is performed by algorithm, implemented in separate or combined code segments, for operation and execution on a processor. Other similar variations and combinations are further comprehended.

The present invention is now described in further detail with reference one specific illustrative application, and certain embodiments associated therewith. Again for purposes of explanation and illustration, one compilation of measurement data from a semiconductor manufacturing process is assembled. In their efforts to create smaller and faster devices, semiconductor manufacturers have focuses on utilizing copper interconnects formed using damascene processes. Damascene methods usually involve forming a trench and/or an opening in a dielectric layer that lies beneath and on either side of the copper-containing structures. Once the trenches or openings are formed, a blanket layer of the copper-containing material is formed over the entire device. Electrochemical deposition (ECD) is typically the only practical method to form a blanket layer of copper. The thickness of such a layer must be at least as thick as the deepest trench or opening. After the trenches or openings are filled with the copper-containing material, the copper-containing material over them is removed, e.g., by chemical-mechanical planarization (CMP).

In such semiconductor processes, post-CMP dishing in the remaining copper is a key metric used to track CMP performance. Dishing is often considered a key metric because of its strong, if not direct, correlation to product yields. This correlation is typically due to the additional topography introduced during the ECD construction of interconnect layers in a given device. In order for dishing to be properly used as a parameter for process control (i.e., to identify anomalous materials or tools), it is necessary to identify and evaluate the accuracy and quality of dishing measurement data reported by a profilometer.

Thus, in this embodiment, the characteristic of concern, $F_1$, is the amount or degree of copper dishing, measured in angstroms. In this embodiment, several dishing measurements are collected from each lot of wafers, across some substantial number (e.g. 200) of lots. This forms the representative cross-section $S_N$ of the entire population P of wafers manufactured. The range of measurements within each separate lot is determined, as is the standard deviation for each. FIG. 1 depicts an illustrative distribution plot 100—representative of range and standard deviation for such an embodiment—that demonstrates the correlation between standard deviation and range of the measurement data taken. Due to the fact that only a limited number of sites are measured, there is a strong correlation between the two parameters and excellent continuity in the values of these parameters. Were conventional standard deviation and range-based analyses being utilized to check for inaccuracies, these parameters would appear to prove undesirable as a gauge of data quality.

Figure 2:
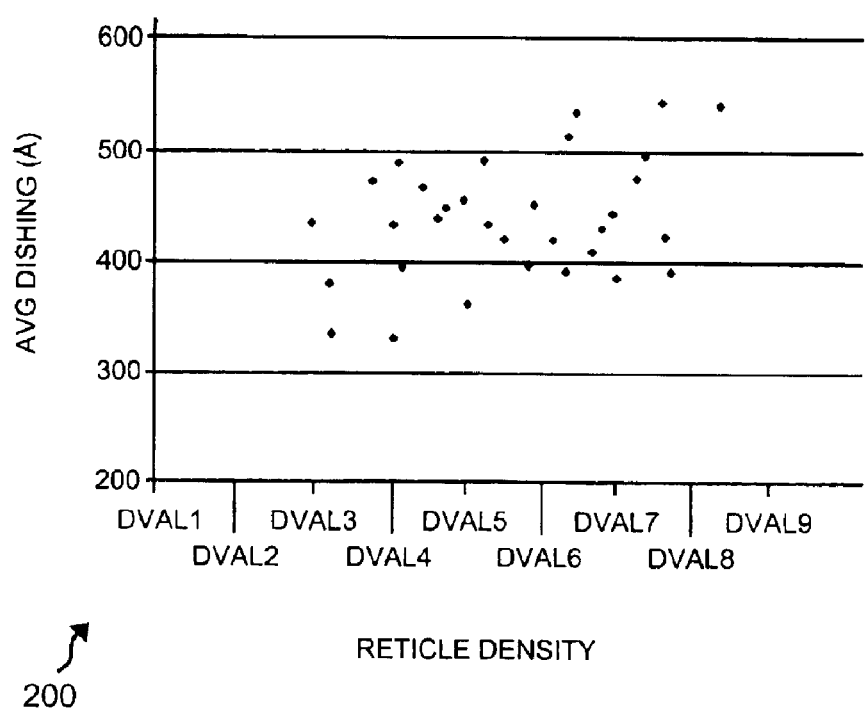
FIG. 2 depicts another illustrative data plot for one embodiment of the present invention.

In this embodiment, $F_1$ (i.e., amount of dishing) is impacted by certain cross wafer properties, particularly the two-dimensional density of the patterned features (i.e., reticle density). Thus, for this embodiment, reticle density is the secondary characteristic $F_S$. Referring now to FIG. 2, an illustrative plot 200 depicts a representative relationship between average cross-wafer dishing and reticle density values DVAL1–DVAL9. This data is analyzed and extrapolated to render a modeling function that relates expected average dishing (Y) to average reticle density (X), of the form:

$$Y=K_1(X)+K_2; \quad (1)$$

where $K_1$ and $K_2$ are constant values derived from numerical analysis of the plotted data. The actual dishing measurement, $M_N$, received from the profilometry tool is compared to the expected dishing, $Y_N$, and the residual $R_N$ is calculated:

$$R_N=M_N-Y_N. \quad (2)$$

The residual values for each $M_N$ are calculated, and the final set of all residual values is $R_P$.

Figure 3:
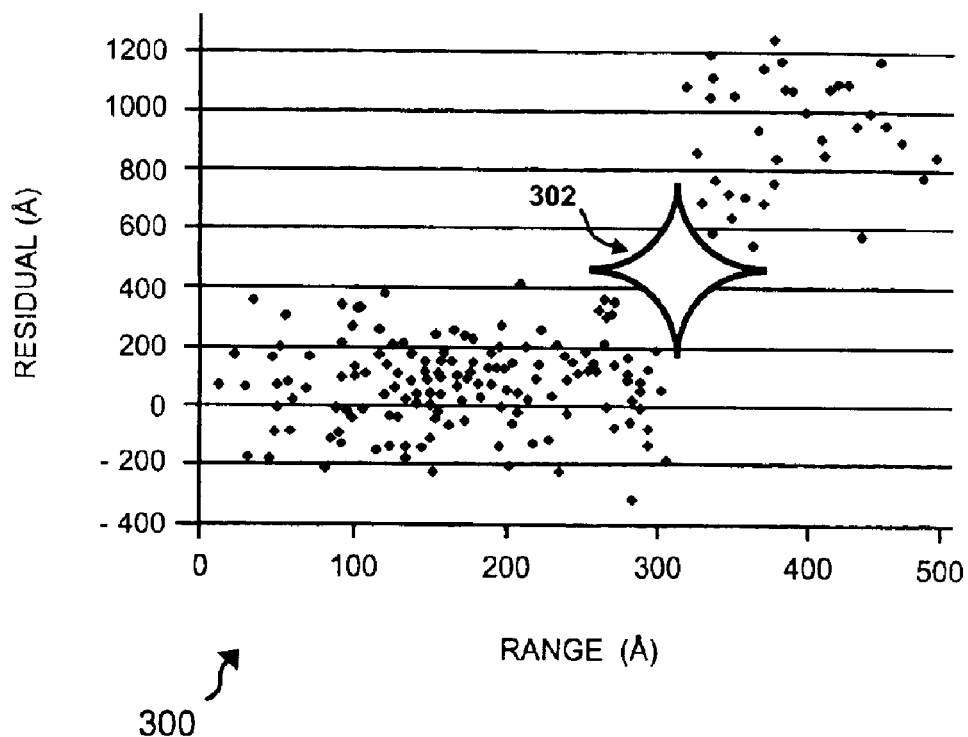
FIG. 3 provides an illustrative example of one embodiment of data analysis according to the present invention.

$R_P$ is analyzed for discontinuities in the residuals contained therein. In this embodiment, this analysis is illustrated by plot 300 of FIG. 3. Plot 300 comprises a plot of representative $R_P$ values against representative values of range of cross-wafer dishing. Graphical analysis of plot 300 reveals a sharp and dramatic discontinuity 302 occurring generally for residual values above 400 Å. Analysis according to the present invention thus provides a sharp, distinct indication of the demarcation between accurate and inaccurate measurement data. In this embodiment, those lots having residual values over 400 Å are tested or re-evaluated. Where the demarcation is so clear, a discontinuity threshold is not necessary. Such a threshold may be provided, however, in embodiments where demarcation is not so sharp.

Figure 4:
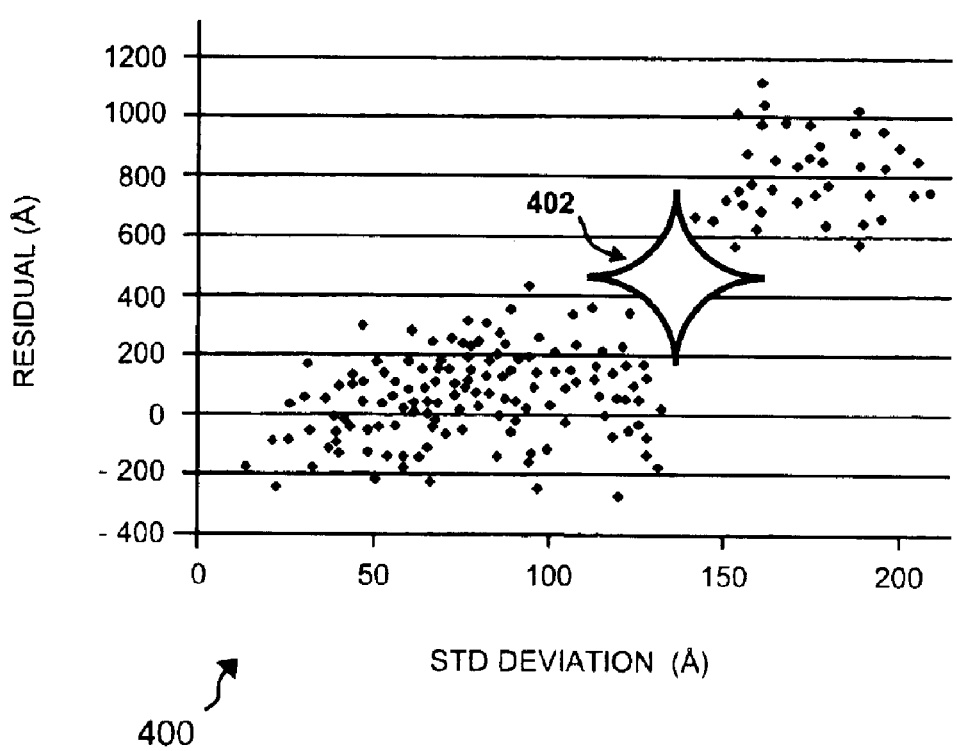
FIG. 4 provides another illustrative example of one embodiment of data analysis according to the present invention.

In addition to or substitution of this analysis, representative $R_P$ values may be plotted against representative standard deviation values, as illustrated by plot 400 of FIG. 4. Graphical analysis of plot 400 also reveals a sharp and dramatic discontinuity 402 occurring generally for residual values above 400 Å. Again, those lots having residual values over 400 Å are tested or re-evaluated. Where the demarcation is so clear, a discontinuity threshold is not necessary. Such a threshold may be provided, however, in embodiments where demarcation is not so sharp.

Figure 5:
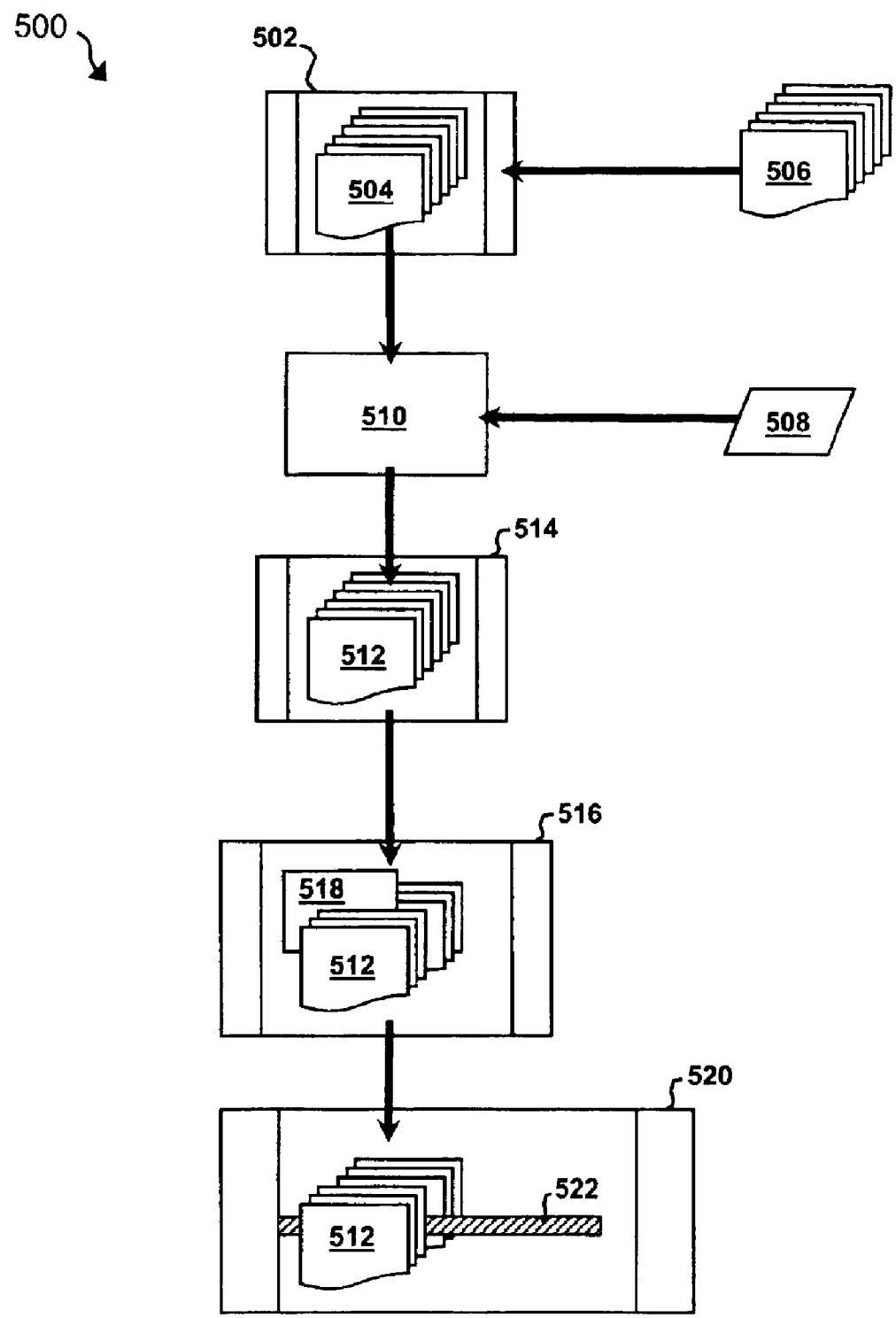
FIG. 5 provides an illustrative example of one embodiment of a data analysis system according to the present invention.

Thus, by the present invention, a system is provided that analyzes data accuracy—particularly the accuracy of industrial measurement data. Referring now to FIG. 5, system 500 provides a general illustrative depiction of one embodiment of such a system. System 500 comprises a construct 502 that compiles a plurality of measurements 504 of a primary characteristic, taken from a representative cross-section 506 of a population of devices. The system further comprises a modeling function 508, and a construct 510. Construct 510 determines a variance, from modeling function 508, for each measurement in the plurality of measurements 504, and forms a corresponding plurality of variances 512. A construct 514 evaluates plurality 512 for discontinuities; and a construct.

The present invention thus provides a versatile system for analyzing data accuracy—particularly measurement data. The present invention provides an immediate and clear indication shifts from accurate to inaccurate data in a simple and efficient manner. The present invention provides a system that is easily adaptable to, and integratable with, a wide variety of high-volume manufacturing processes. The system of the present invention provides a focused methodology for evaluating data accuracy in a number of high-precision, small-scale applications.

Again, the embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for analyzing accuracy of industrial measurement data, the method comprising the steps of:
   compiling a plurality of measurements of a primary characteristic from a representative cross-section of a population of devices;
   providing a modeling function;
   determining a variance from the modeling function for each measurement in the plurality of measurements to form a corresponding plurality of variances;
   evaluating the plurality of variances for discontinuities;
   identifying a discontinuity within the plurality of variances; and
   utilizing the discontinuity to determine a demarcation between accurate and inaccurate measurement data.

2. The method of claim 1, wherein the industrial measurement data comprises semiconductor manufacturing measurement data.

3. The method of claim 2, wherein the primary characteristic comprises dishing in metal.

4. The method of claim 2, wherein the primary characteristic comprises dishing in copper.

5. The method of claim 1, wherein the step of compiling a plurality of measurements further comprises compiling a plurality of measurements from a profilometer.

6. The method of claim 1, wherein the representative cross-section of a population of devices comprises multiple sites around a single device.

7. The method of claim 1, wherein the representative cross-section of a population of devices comprises multiple devices within the population of devices.

8. The method of claim 1, wherein the step of providing a modeling function further comprises providing a constant value.

9. The method of claim 1, wherein the step of providing a modeling function further comprises providing a function relating the primary characteristic to a secondary characteristic.

10. The method of claim 9, wherein the function is linear.

11. The method of claim 9, wherein the function is parabolic.

12. The method of claim 1, wherein the step of determining a variance from the modeling function further comprises determining a residual value.

13. The method of claim 1, wherein the step of evaluating the plurality of variances for discontinuities further comprises a graphical evaluation.

14. The method of claim 13, wherein at least a portion of the graphical evaluation is manual.

15. The method of claim 1, wherein the step of evaluating the plurality of variances for discontinuities further comprises a non-graphical evaluation.

16. The method of claim 15, wherein at least a portion of the non-graphical evaluation is manual.

17. The method of claim 15, wherein the non-graphical evaluation is performed exclusively by a processor.

18. A system analyzing the accuracy of industrial measurement data, the system comprising:
   a construct for compiling a plurality of measurements of a primary characteristic from a representative cross-section of a population of devices;
   a modeling function;
   a construct for determining a variance from the modeling function for each measurement in the plurality of measurements to form a corresponding plurality of variances;
   a construct for evaluating the plurality of variances for discontinuities;
   a construct for identifying a discontinuity within the plurality of variances; and
   a construct for determining a demarcation between accurate and inaccurate measurement data based on the discontinuity.

19. A method for analyzing accuracy of post-CMP dishing measurements rendered by a profilometer in a semiconductor manufacturing process, the method comprising the steps of:
   compiling a plurality of dishing measurements from a representative cross-section of semiconductor devices;
   providing a modeling function;
   determining a variance from the modeling function for each dishing measurement in the plurality of dishing measurements to form a corresponding plurality of variances;
   evaluating the plurality of variances for discontinuities;
   identifying a discontinuity within the plurality of variances; and
   utilizing the discontinuity to determine a demarcation between accurate and inaccurate dishing measurement data.

20. The method of claim 19, wherein the dishing comprises dishing in metal.

21. The method of claim 19, wherein the dishing comprises dishing in copper.

22. The method of claim 19, wherein the representative cross-section of semiconductor devices comprises multiple sites around a semiconductor wafer.

23. The method of claim 19, wherein the representative cross-section of semiconductor devices comprises multiple semiconductor wafers within a lot of semiconductor wafers.

24. The method of claim 19, wherein the representative cross-section of semiconductor devices comprises multiple semiconductor wafers within multiple lots of semiconductor wafers.

25. The method of claim 19, wherein the step of providing a modeling function further comprises providing a constant value.

26. The method of claim 19, wherein the step of providing a modeling function further comprises providing a function relating the dishing to a secondary characteristic.

27. The method of claim 26, wherein the step of providing a modeling function further comprises providing a function relating the dishing to reticle density.

28. The method of claim 26, wherein the function is linear.

29. The method of claim 26, wherein the function is parabolic.

30. The method of claim 19, wherein the step of determining a variance from the modeling function further comprises determining a residual value.

31. The method of claim 19, wherein the step of evaluating the plurality of variances for discontinuities further comprises a graphical evaluation.

32. The method of claim 31, wherein at least a portion of the graphical evaluation is manual.

33. The method of claim 19, wherein the step of evaluating the plurality of variances for discontinuities further comprises a non-graphical evaluation.

34. The method of claim 33, wherein at least a portion of the non-graphical evaluation is manual.

35. The method of claim 33, wherein the non-graphical evaluation is performed exclusively by a processor.

* * * * *